United States Patent [19]

Dreyer et al.

[11] Patent Number: 4,563,574
[45] Date of Patent: Jan. 7, 1986

[54] HUB ODOMETER

[75] Inventors: Hans Dreyer, Egelsbach-Bayerseich; Manfred Rieger, Frankfurt am Main, both of Fed. Rep. of Germany

[73] Assignee: Jost-Werke GmbH, Neu Isenburg, Fed. Rep. of Germany

[21] Appl. No.: 655,644

[22] Filed: Sep. 28, 1984

[30] Foreign Application Priority Data

Oct. 1, 1983 [DE] Fed. Rep. of Germany ....... 3335722

[51] Int. Cl.⁴ ............................................. G01C 22/00
[52] U.S. Cl. ................................. 235/95 B; 235/95 C; 235/96
[58] Field of Search ....................... 235/95 R, 95 B, 96

[56] References Cited

U.S. PATENT DOCUMENTS 1,026,070  5/1912  Boomhower et al. ............. 235/95 C
3,130,907  4/1964  Coffey ................................ 235/95 C
4,156,131  5/1979  Haynes et al. ..................... 235/95 B Primary Examiner—Benjamin R. Fuller
Attorney, Agent, or Firm—Barlow & Barlow

[57] ABSTRACT

A hub odometer having a protective case adapted to be mounted axially on an axle cap of a vehicle with a substantially cylindrical carrier plate rotatably mounted in the case for supporting a counting mechanism having figure wheels. The shaft of the figure wheels is mounted transversely of the axis of rotation of the case within the carrier plate, and a reduction gearing transfers the relative rotation of case and carrier plate to the figure wheels. At least one ball of heavy metal is provided, the ball being movably positioned in substantially diametrical opposition with respect to the case axis to the figure wheels, the ball being heavier than the counting mechanism.

9 Claims, 3 Drawing Figures

HUB ODOMETER

BACKGROUND OF THE INVENTION

In a prior known hub odometer, the balls are positioned above and the counting mechanism is positioned below the axis of rotation of the case. A rotor is provided in the case and balls are movable in a chamber on the rotor substantially only radially with respect to the axis of rotation of the case. The horizontal position of the counting mechanism mounted on the rotor during the rotation of the case is ensured as the center of gravity of the rotor is below the axis of rotation of the case. On the backside of the rotor base a stepping mechanism is positioned, which is driven through a slotted crank by an eccentric disk rotating together with the case about the axis of rotation of the case. Coupling between the disc and counting mechanism consists of a worm gear mounted on the front side of the rotor base. Although this results in a relatively thin construction of the odometer in the direction of the axis of rotation of the case, the axial thickness of the odometer is still relatively great due to the construction of the reduction gear. Furthermore, the rotor requires a relatively great amount of material, in order to provide a counter weight for the balls positioned above the axis of rotation of the case, which counter weight ensures that the weight of the balls does not cause a rotation of the carrier and consequently a reversal of the counting mechanism in its position of rest.

In another known odometer as disclosed in U.S. Pat. No. 3,130,907, seven balls are positioned in a plane behind the counting mechanism within an annular space completely surrounding the axis of rotation of the case. With this construction most of the balls as well as the counting mechanism lie below the axis of rotation of the case in the position of rest, in order to ensure that the center of gravity of the carrier and its built-in parts are as far as possible below this axis of rotation. This construction results in an extremely great axial thickness of the odometer.

SUMMARY OF THE DISCLOSURE

It is an object of the present invention to provide a hub odometer of the above type, wherein the rotational position of the carrier is stable within the whole speed range of the vehicle wheel.

It is a further object of the present invention to provide a hub odometer of the above type, wherein the thickness in axial direction is small and a minimal amount of material is required.

Still another object of the present invention is to provide a hub odometer of the above type which is simpler to be manufactured.

These and other objects are achieved with a hub odometer of the above type in that the ball is positioned below the axis of rotation of the case within a guiding path partly surrounding the axis of rotation of the case and between a pair of pressure springs positioned within the guiding path, and the reduction gear comprises a spur gear within a space between the guiding path and the figure wheels of the counting mechanism.

With this construction all bulky built-in parts of the carrier plate are substantially in a vertical plane which is perpendicular to the axis of rotation of the case, such that the construction of the odometer is very flat in the direction of the axis of rotation of the case. The amount of material needed for forming the carrier is relatively low as the ball lowers the center of gravity of the carrier to a point below the rotation axis of the case. Nevertheless a substantially stable angular position of the carrier is ensured, in which position the shaft of the figure wheels is horizontal, since even with a shocklike acceleration of the odometer transversely of the axis of rotation of the case, either in horizontal and/or vertical direction, the deviation of the ball will be attenuated and reduced, since the pressure springs along with the gravity of the ball, maintain a position of the ball as low as possible below the axis of rotation. Accordingly, the ball maintains the position of the carrier plate and consequently that of the counting mechanism throughout the speed range of the case, from the lowest to the highest speed, substantially stable without any appreciable rotation of the carrier plate.

Preferably the guiding path for the ball is in the form of a part of a circle. Such a path is easy to manufacture and provides a relatively large space between the counting mechanism figure wheels and the guiding path for locating reduction gearing. Accordingly, the number and the diameter of the gears can be varied within wide limits for adapting the reduction ratio of the reduction gearing to the external diameter of the respective vehicle tire.

There may be two balls positioned between the pressure springs. These balls not only shift the common center of gravity of the carrier and its built-in parts further down below the axis of rotation of the case, so that the angular position of the carrier will be more stable, but also increase the stability of the position of the carrier with respect to vertical shocks, since the balls, in such a case, would separate and would be accelerated upwards, their reaction forces substantially cancelling each other, the carrier assuming better stability against such vertical shocks.

The pressure springs may simply comprise coil or helical springs. It would be possible, however, to manufacture the springs from another elastic material, for instance from compact or porous synthetic.

Preferably the material of the ball or balls is steel. Such balls are commercially available and accordingly inexpensive. They may also be provided with a very smooth, polished surface so that their friction within the guide path is substantially negligible.

However, it is also possible to select a ball material which is diamagnetic and has a higher specific weight than steel. Such a material, for instance lead, allows for manufacturing balls with smaller diameter than that of a steel ball having the same weight, so that the radial distance between the ball and the axis of rotation of the case, with the same diameter of the carrier, will be greater and the moment of inertia about this axis of rotation will be increased. Using diamagnetic material avoids moving the ball in the guide path and consequently rotating the carrier by an outer magnetic field, either unintentionally or intentionally.

Furthermore, provision is made so that the relative rotation of case and carrier is transmitted through a plurality of spur reduction gears to a steppihg mechanism actuating the least significant figure wheel. In this construction the common plane of the spur reduction gears is perpendicular with respect to the axis of rotation of the case, so that the desired spur gear may be simply inserted at the desired position into the carrier plate from its open front side. This construction also allows for a simple change of the wheels of the wheel gear, in order to change the reduction ratio of the reduction gears. Also, the diameter of the gears may be selected independently of the axial thickness of the odometer.

Preferably the carrier plate is made from elastic synthetic material. This not only allows for a simple manufacture of the carrier, but also results in an additional padding of the gear against shocks.

It is also advantageous if the last axle of the spur gear is integrally formed with the bottom of the carrier plate by injection molding. This allows the axle and the carrier plate to be manufactured as an integral piece. In this case specific means for securing the axle will be avoided.

Furthermore, the bearings of all axles of the counting mechanism may be pockets open in the direction of rotation of the axis of rotation of the case, the pockets being at least partly closed by hot forming after introducing the axles. This also allows for integrally manufacturing the carrier and the axle bearings without additional means for securing the axles.

A front plate covers the carrier plate and has a window for viewing the figure wheels. Studs for securing the front plate may be molded on the carrier, the studs passing through securing holes in the front plate and deformed by heat. This avoids securing means, such as screws or rivets, for securing the front plate.

BRIEF DESCRIPTION OF THE DRAWINGS

The invention and its further developments will now be described in greater detail with reference to the accompanying drawings of preferred embodiments of the invention, in which.

DETAILED DESCRIPTION OF THE PREFERRED EMBODIMENTS

Figure 1:
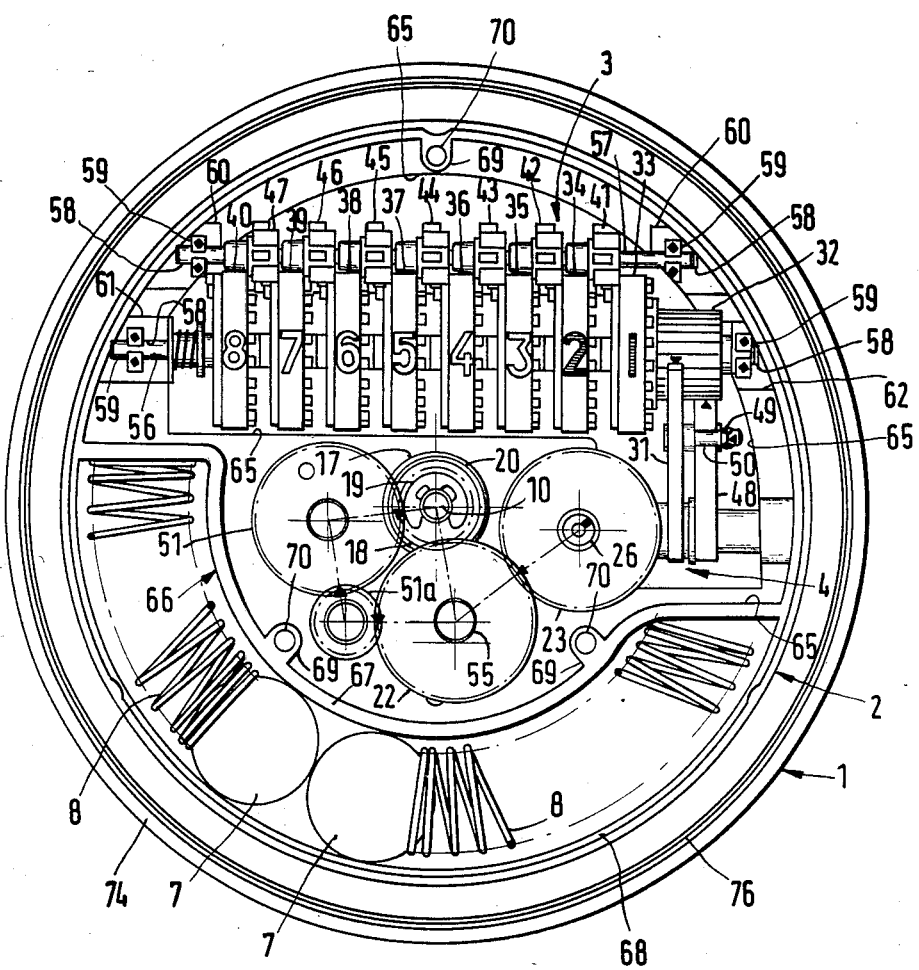
FIG. 1 is a front view of a first embodiment of an odometer according to the invention before mounting the front plate and a cover.

The main components of the shown odometer are a cylindrical steel case 1, a circular carrier plate 2 made from elastic synthetic material and rotatably mounted within the case 1, a counting mechanism 3 made from synthetic material, reduction gearing 4, a metallic front plate 5 having a window, a translucent cover 6 made from synthetic material, a pair of identical balls 7 made from steel and a pair of identical pressure springs 8 made from helically wound spring steel wire.

Figure 2:
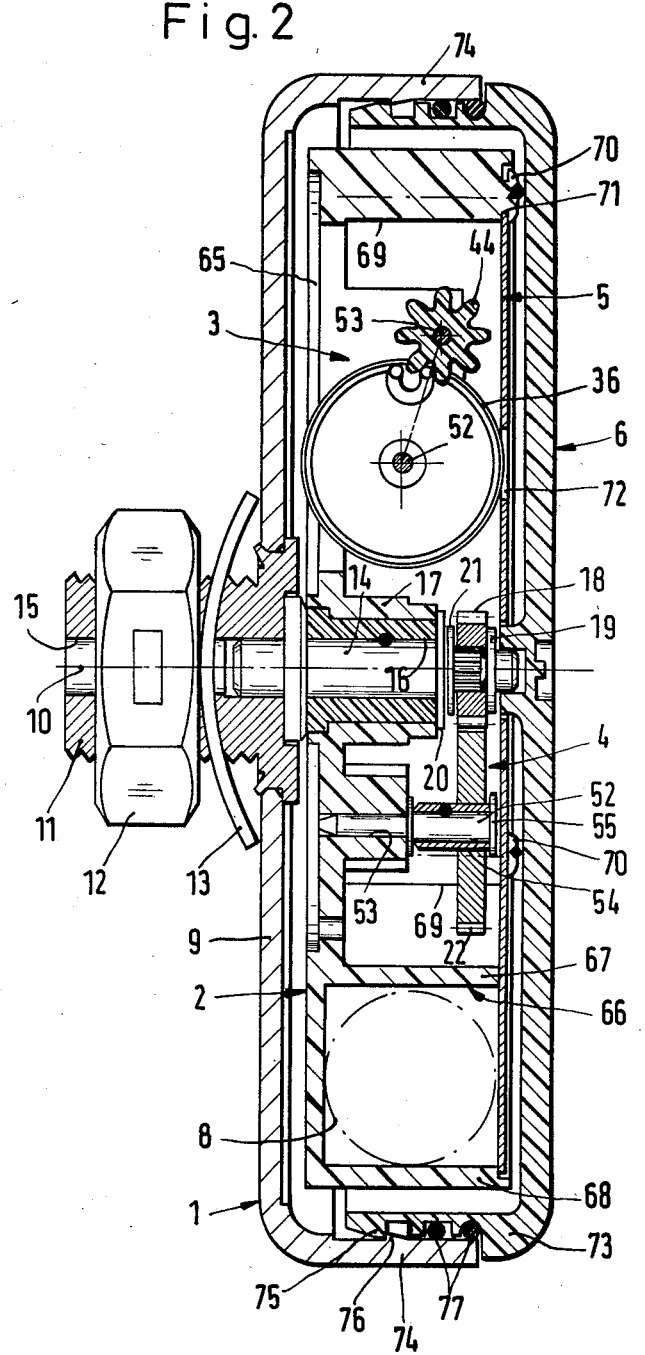
FIG. 2 is a vertical axial section of the odometer of FIG. 1 with the front plate and the cover mounted.

As shown in FIG. 2, the case 1 has a rear wall 9. Secured coaxially with respect to the rotational axis 10 of the case 1 is an externally threaded mounting stud 11 that may be fitted with a securing nut 12 and a resilient washer 13. The mounting stud 11 and the nut 12 allows the case 1 to be coaxially fixed to an axle cap (not shown) which is fixed to a wheel hub of a vehicle such that it rotates together with the wheel of the vehicle. In the embodiment shown in FIG. 3 the case 1 will be non-rotatably fitted with its circumference into a pot shaped axle cap. Therefore, in this case the mounting stud 11' is not externally threaded.

Figure 3:
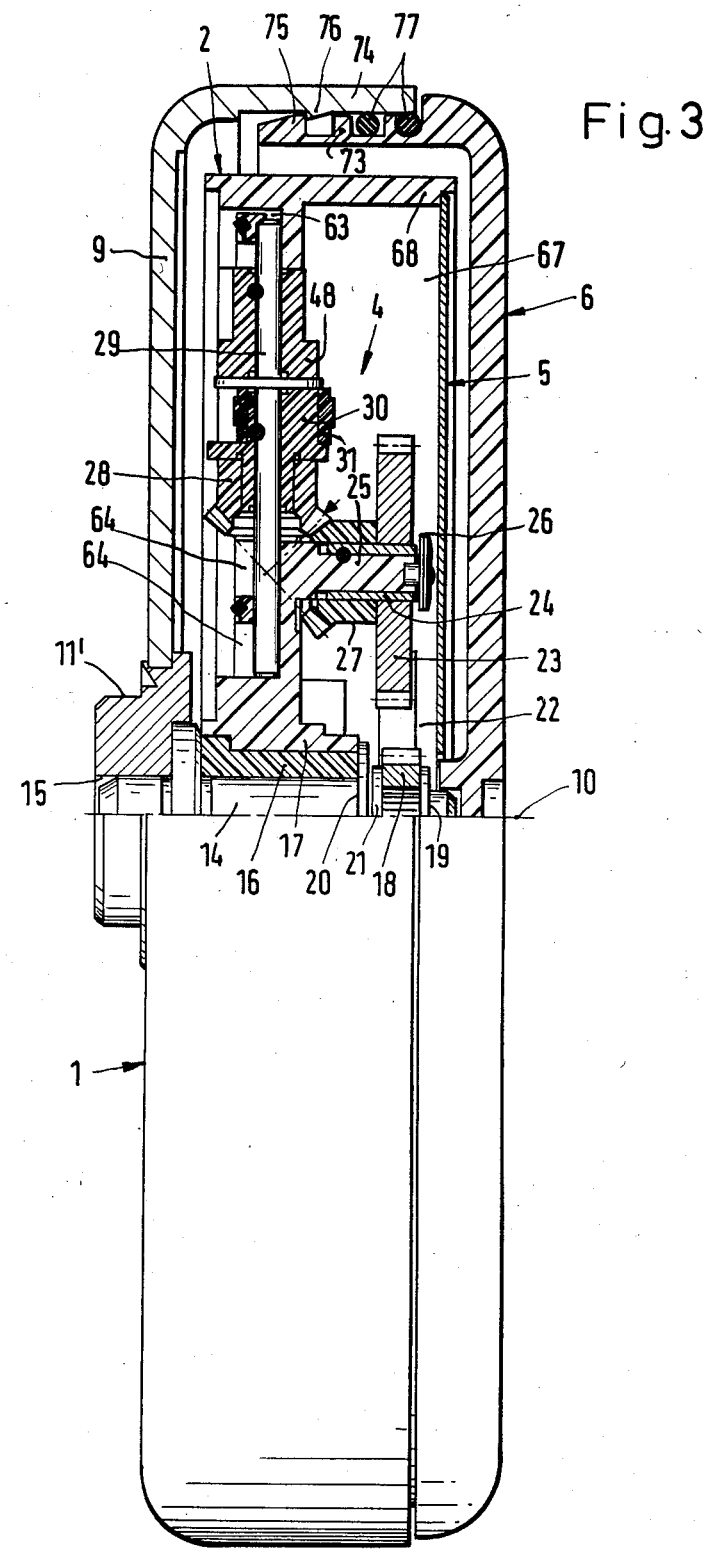
FIG. 3 is a horizontal axial section of a second embodiment of an odometer according to the invention, which differs from that of FIG. 1 and 2 only with respect to a bearing bolt at the backside.

The carrier plate 2 is rotatably supported on a stud 14 having a collar. One end of the stud 14 is press fitted into a coaxial boring 15 of the mounting stud 11 or 11', respectively, and on the other end the stud rotatably receives a plane bearing bush 16 made from elastic synthetic material. (all plain or slide bearing surfaces are marked in the drawings by a point.) The plain bearing bush 16 is press-fitted in a boss, which is provided coaxially with respect to the axis 10 of rotation of the case, or a cylindrical base protuberance 17 of the carrier plate 2. One end of the stud 14, which is within the internal space of the carrier plate 2 carries a pinion 18 which is secured by a clip ring 19. Washers 20, 21 are mounted between the pinion 18 and the base protuberance 17. The pinion 18 meshes with a spur gear wheel 22 which itself meshes with a spur gear wheel 23. The spur gear wheel 23 is non-rotatably carried on a plain bearing bush 24 which itself is rotatably mounted on an axle 25, which is molded integrally with the base of the carrier plate 2 by injection molding. A ring 26 for securing the position of the toothed wheel 23 is positioned on the axle 25 and is secured itself by ultra-sonic hot deforming of the end of the axle 25. Further, a toothed bevel wheel 27 made from synthetic material is non-rotatably mounted on the plain bearing bush 24 and meshes with a toothed bevel wheel 28 made from synthetic material. The bevel wheel 28 is non-rotatably mounted on the hub of a disc 30 excentrically mounted on an axle 29 (FIG. 3). The disc 30 is rotatably mounted in a circular hole provided in one end of a stepping pawl 31. The stepping pawl 31 meshes with a tooth at its free end in circumferential teeth of a ratchet wheel provided by a hub 32 of the figure wheel 33 of the least significant decimal of the counting mechanism 3 comprising eight successively arranged figure wheels 33 to 40 with interposed tooth wheels 41 to 47 for transferring the decimal carry. Each of the tooth wheels 41 to 47 causes, in a known manner after each revolution of the figure wheel of the proceeding decimal, a further rotation of the figure wheel of the following decimal by one step, i.e. one decimal digit. On the axle 29 there is further rotatably mounted a click pawls 48 meshing with a tooth on its free end at that side of the ratchet wheel 32, which is opposite to the stepping pawl 31. Both pawls 31, 48 are drawn together by a tension spring 49 and pressed against the ratchet wheel 32. The tension spring 49 is hooked in on lateral studs 50 of the pawls 31, 48.

Alternately, two additional spur gear wheels 51, 51a may transmit the rotation of the pinion 18 to the gear wheel 22 or another intermediate gear wheel. In this case the gear wheel 22 or intermediate gear wheel does not mesh with the pinion 18. This will result in a different reduction ration of the reduction gear 4, in order to adapt the counting mechanism 3 to a vehicle wheel having a different diameter.

The axle 52 of the gear wheel 22, which axle consists of metal and has a stepped diameter, is press-fitted with its reduced diameter section into a boring 53 of an internal base protuberance of the carrier plate 2. The gear wheel 22 is non-rotatably mounted on a plain bearing bush 54 consisting of synthetic material, and the plain bearing bush 54 is rotatably mounted on the larger diameter section of the axle 52. A clip ring 55 secures the position of the gear wheel 22 and the plane bearing bush 54. In order to exchange the gear wheel 22, the axle 52 will be withdrawn from the bore 53 by manually gripping the gear wheel 22 and overcoming the presfit and thereafter pressing a premounted unit consisting of parts 52, 54, 55 and a different gear wheel 22 into the bore 53. If the gear wheels 51, 51a are provided, they are mounted and exchangeable in the same manner. This allows for quickly exchanging the gear wheels, in order to change the reduction ratio of the gear for adaption to different dia-meters of the vehicle wheel.

The counting mechanism 3 is mounted on axles 56 and 57, the ends of which are rotatably mounted in pockets 58 of the carrier plate 2. After having introduced the axles 56, 57 into the pockets 58, these pockets 58 will be at least partly closed by ultra-sonic hot deformation for securing the position of the axles 56, 57. This deformation results in deformation tabs 59 overlapping the axles. (All hot deformed points are marked in the drawings by black rectangles.) The pockets 58 are formed in base protuberances 60, 61 and 62.

The axle 29 is also mounted in corresponding pockets 63 and 64 of the carrier 2 (see FIG. 3).

The carrier plate 2 is provided, in a region of the counting mechanism 3 lying above the rotational axis 10 and the pawls 31, 48, with an opening 65 receiving the rearward part of the counting mechanism 3. The marginal region of the carrier plate 2, which is lying below the axis 10 of rotation, is provided with a circular guide path 66 open to the front and defined by an internal wall 67 and by the circumferential wall 68 of the carrier plate 2. The center of curvature of the guide path 66 coincides with the axis 10 of rotation. The guide path 66 surrounds the axis 10 of rotation at one side of a vertical plane coinciding with the axis 10 of rotation by somewhat more than 90° and on the other side by somewhat less than 90°, i.e. in total by approximately 180°. In this guide path 66 are balls 7 positioned between pressure springs 8. The balls 7 are movable in the guide path 66 against the force of the pressure springs 8.

The internal side of the internal wall 67 is integrally formed with two radially inwardly projecting ribs 69. The front side of these ribs 69 is integrally formed with studs 70 which, after having installed the counting mechanism 3 and the reduction gear 4 in the carrier plate 2, will be passed through securing holes 71 in the cover plate 5 and hot deformed by ultra-sonic, as shown in FIG. 2. Accordingly, the studs 70 will secure the position of the cover plate like the head of a rivet.

The cover plate 5 is provided with an opening 72 (FIG. 2) the height of the figure wheels 33, which opening serves as a window and allows a view of the figure wheels 33 to 40.

After having mounted the cover plate 5, the translucent cover 6 will be inserted with its circumferential wall 73 into the gap between the circumferential wall 68 of the carrier 2 and the circumferential wall 74 of the protective case 1 such that an undercut 75 on the outer side of the circumferential wall 73 snaps in behind an undercut 76 on the inner side of the circumferential wall 74. Sealing "O" rings 77 inserted into annular grooves on the outer side of the circumferential wall 73 seal the internal space of the case 1 against penetration of humidity and dust. The sealing "O" rings 77 at the same time allow for compensation of compressive strains in the circumferential wall 74 of the case 1, if it is pressed into an axial cap. Before inserting the cover 6, the internal space of the case 1 will be filled by nitrogen.

As shown in the drawings, the reduction gear 4 is positioned in the space between the counting mechanism 3 and the guide path 66 such that the center of gravity of the reduction gear is below the axis 10 of rotation. Accordingly, the main parts of the odometer lie substantially in the same plane, so that a compact and flat construction of the odometer is achieved in the direction of the axis 10 of rotation. Since the counting mechanism 3 is made from synthetic material, it has a very low weight. Accordingly, the weight of only one ball 7 is already much greater than that of the counting mechanism 3. Also the center of gravity of the carrier plate 2 is below the axis 10 of rotation due to the opening 65 in the carrier plate 2.

As the case 1 is rotated during the rotation of the vehicle wheel, the carrier plate 2 substantially maintains its spatial position throughout the range of speed of the vehicle wheel since its common center of gravity is far below the axis 10 of rotation. The pinion 18, which is solidly connected with the case 1 is at the same time rotated relatively to the carrier 2 such that its rotation is transmitted by the other gear wheels and the stepping mechanism 31, 32, 48 to 50 to the counting mechanism 3. If during operation the counting mechanism 3 is slightly rotated, due to friction, out of its horizontal position as shown in the drawings, then it would be returned to the horizontal position at least during standstill of the vehicle, in which position the indicated count of the counter is easily readable. Any rotation of the carrier 2 out of its rest position shown in the drawings, which will be due to a shock strain of the odometer, for instance due to an acceleration or deceleration of the vehicle or due to an uneven ground and due to the inertia of mass of the odometer and that of its built-in parts, particularly that of the balls 7, will be cancelled particularly by the great mass of the balls 7, since the balls always tend to assume the lowest position in the guide path 66, thereby jointly rotating the carrier 2. This return of the balls 7 into the lowest position is assisted by the pressure springs 8 tending to center the balls 7 between themselves in the guide path 66. Due to the asymmetrical position of the guide path 66 with respect to the vertical plane coinciding with the axis 10 of rotation the balls 7 cannot assume the lowest point below the axis 10 of rotation in the position of rest, so that their common center of gravity always remains on one side of this vertical plane. Nevertheless, the axles 56, 57 of the counting mechanism 3 (and therefore the counting mechanism itself) assume a horizontal position, because the center of gravity of the reduction gear 4 is on the other side of the vertical plane in the position of rest. The pressure springs 8 also damp a separating movement of the balls 7, at the same time counteracting, if a vertical shock is executed on the odometer, an upwards movement of the balls 7 in opposite directions in the guide path 66.

Instead of a pair of balls 7 only one may be provided. Furthermore, the guide path 66 need not be circular. Instead, it may have a different curvature or may be substantially V-shaped. The force of the pressure springs 8 should be as small as possible. The balls 7 may alternatively consist of a diamagnetic heavy metal such as lead, in order to avoid an intended or unintended rotation of the carrier 2 by an outer magnetic field moving past a ball 7, particularly a rotary field.

We claim:
1. A hub odometer comprising a cylindrical case with a rear wall adapted to be mounted axially on the axis of rotation of a wheel of a vehicle,
    a carrier plate mounted for rotation in said case coaxially with the axis of the wheel, said plate supporting a counting mechanism, said counting mechanism mounted on said plate to one side of the axis of rotation of said plate, spur gear means spaced from said plate coupling the case to the counting mechanism, at least one ball being movably positioned in substantially diametrical opposition with respect to said case axis to said counting mechanism, an arcuate guiding path on said plate of less than 180° diametrically opposite said counting mechanism, said ball being positioned between a pair of pressure springs positioned within said guiding path, and said spur gear means is positioned within the space between the guiding path and the counting mechanism.

2. An odometer as in claim 1 wherein the counting mechanism has a plurality of figure wheels rotatably mounted on a shaft which is mounted transversely of the axis of rotation of said plate.

3. An odometer as in claim 1 wherein two balls are positioned between said pressure springs.

4. An odometer as in claim 1 wherein said pressure springs are helical coil springs.

5. An odometer as in claim 1 wherein the material of said ball is diamagnetic that has a higher specific gravity than steel.

6. An odometer as in claim 2 wherein the spur gear means is coupled through reduction gears, bevel gears and a stepping mechanism to the least significant figure wheel.

7. An odometer as in claim 6 wherein an axle of said spur gear means is integrally formed from the wall of said carrier plate.

8. An odometer as in claim 6 wherein the bearings are formed integral with the wall of the carrier plate and the bearings of the counting mechanism are pockets open in the direction of rotation of the axis of rotation of said case, said pockets being at least partly closed after introducing said axles.

9. An odometer as in claim 6 comprising a front plate secured in spaced relation to said carrier plate and having a window for viewing said figure wheels, said front plate being secured by studs extending from said carrier plate.

* * * * *